United States Patent
Hamilton, II et al.

(10) Patent No.: US 7,496,948 B1
(45) Date of Patent: Feb. 24, 2009

(54) METHOD FOR CONTROLLING ACCESS TO A TARGET APPLICATION

(75) Inventors: Rick A. Hamilton, II, Charlottesville, VA (US); Jenny S. Li, Danbury, CT (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/025,201

(22) Filed: Feb. 4, 2008

(51) Int. Cl.
*H04L 9/32* (2006.01)
*G06F 15/173* (2006.01)
*G01C 21/00* (2006.01)
*G08B 1/08* (2006.01)

(52) U.S. Cl. .................. 726/1; 726/2; 726/3; 726/4; 726/5; 726/7; 709/225; 701/213; 340/539.1; 380/258; 380/274

(58) Field of Classification Search .................. None
See application file for complete search history.

(56) References Cited

U.S. PATENT DOCUMENTS

| 6,845,453 | B2* | 1/2005 | Scheidt et al. ............ 726/5 |
| 6,931,131 | B1 | 8/2005 | Becker, Jr. et al. |
| 7,120,254 | B2* | 10/2006 | Glick et al. .............. 380/258 |
| 7,260,835 | B2* | 8/2007 | Bajikar ...................... 726/4 |
| 7,299,125 | B2* | 11/2007 | Marks et al. ............. 701/201 |
| 2002/0089434 | A1* | 7/2002 | Ghazarian ................ 340/988 |
| 2005/0138410 | A1 | 6/2005 | Masuouka et al. |
| 2006/0033608 | A1* | 2/2006 | Juels et al. .............. 340/10.1 |
| 2006/0035707 | A1* | 2/2006 | Nguyen et al. ........... 463/29 |
| 2007/0162954 | A1 | 7/2007 | Pela |

* cited by examiner

*Primary Examiner*—Syed A. Zia
*Assistant Examiner*—Kaveh Abrishamkar
(74) *Attorney, Agent, or Firm*—Cantor Colburn LLP; Justin Dillon

(57) ABSTRACT

A method for controlling access to a target application in accordance with an exemplary embodiment is provided. The method includes determining whether a user is within a predetermined distance from at least one predetermined base device. The method further includes determining whether the predetermined base device is within a predetermined geographical region. The method further includes receiving user access information associated with the user and authenticating the user access information. The method further includes authorizing a user computer only when the user is within the predetermined distance from the predetermined base device, and the predetermined base device is within the predetermined geographical region, and the user access information corresponds to predetermined user access information associated with the user. The method further includes allowing the user computer to access the target application when the user computer has been authorized.

3 Claims, 8 Drawing Sheets

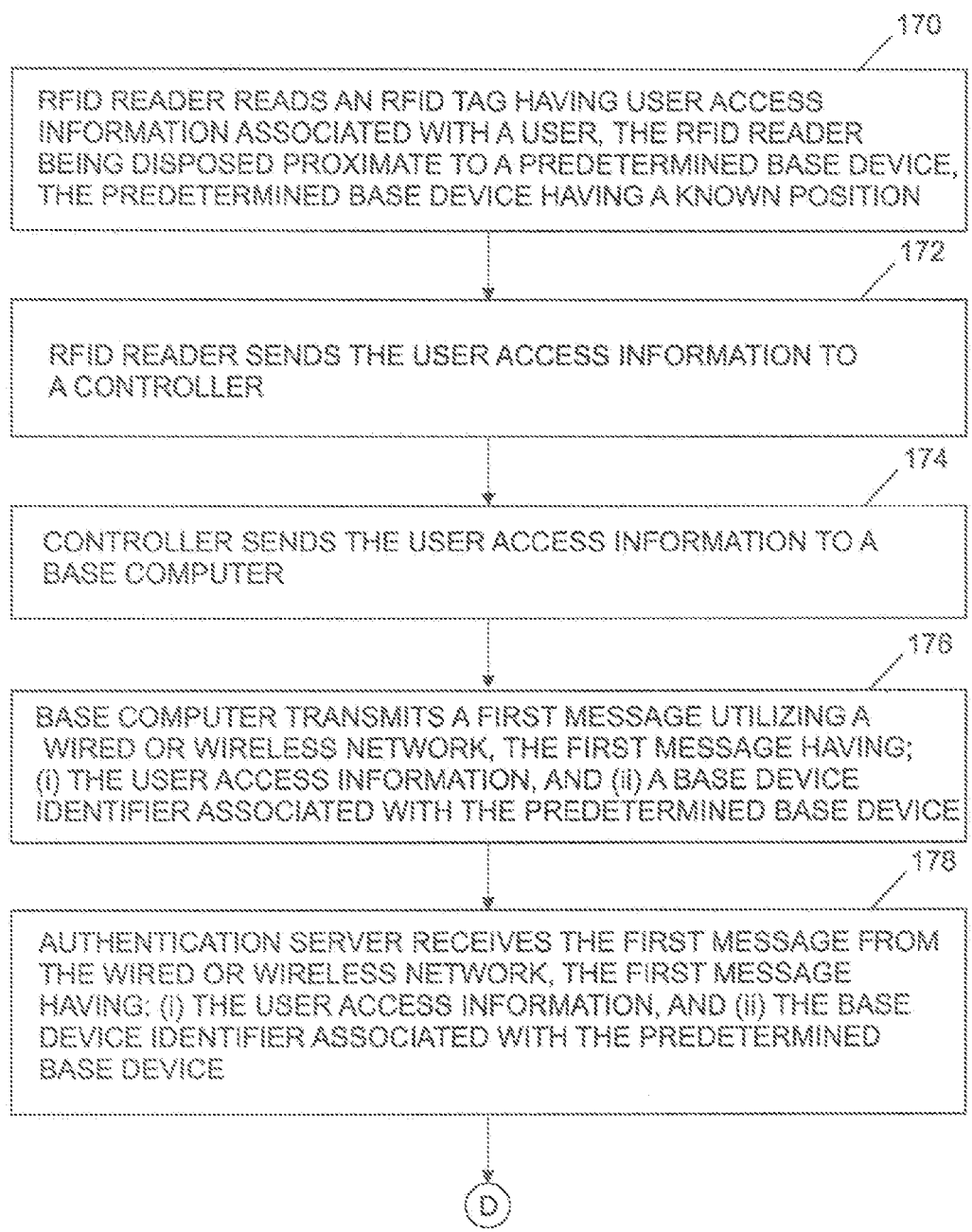

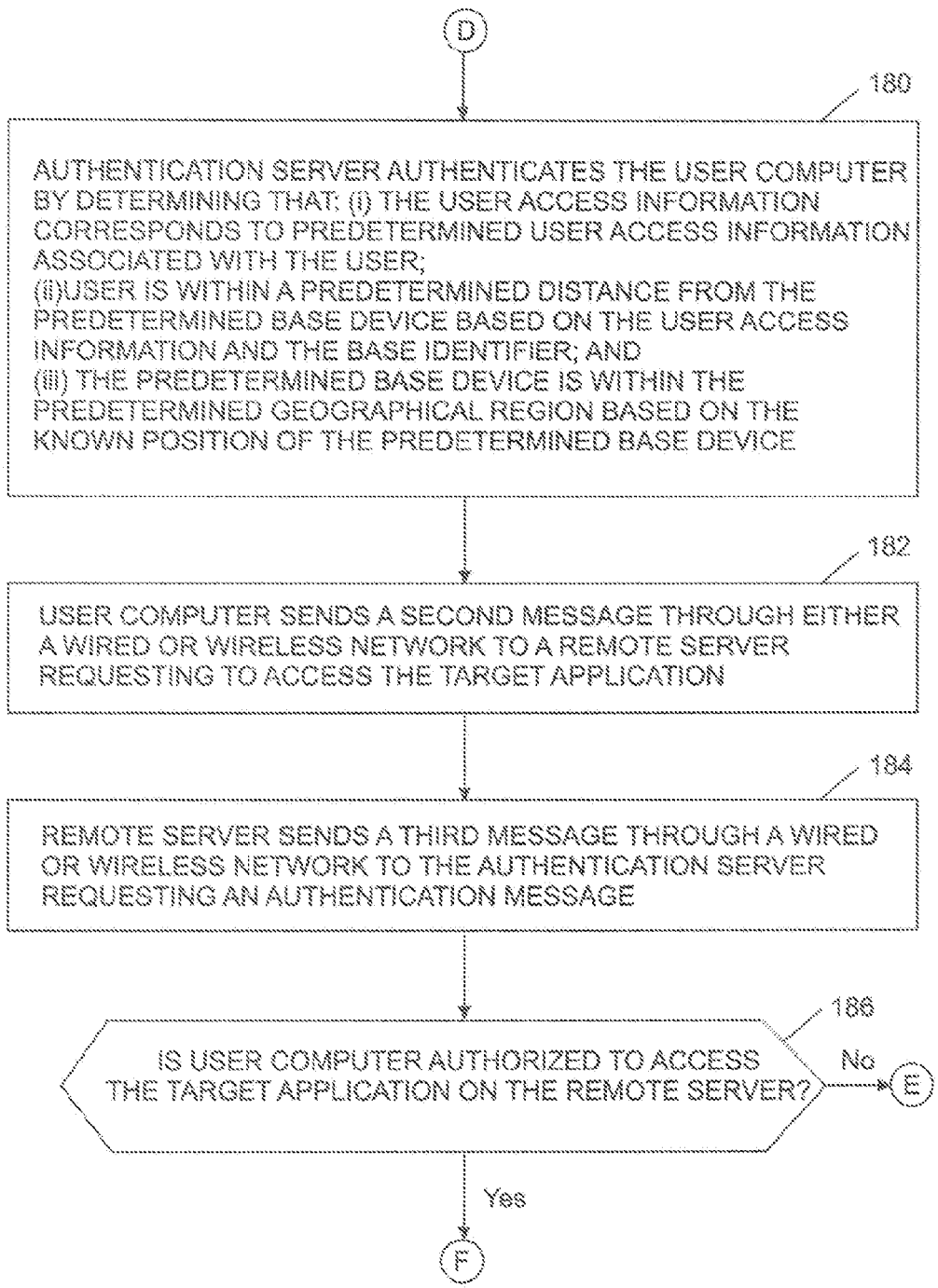

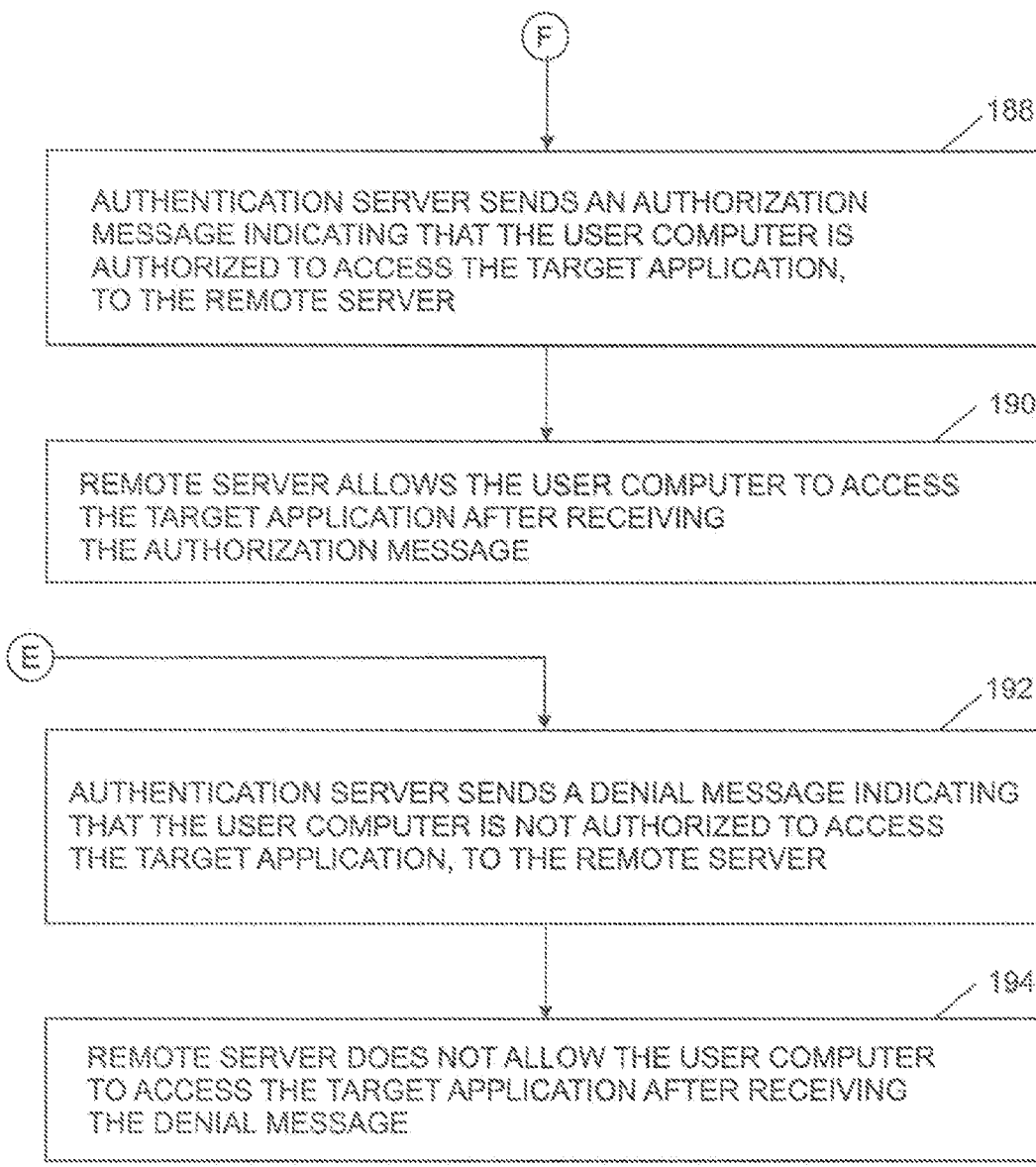

METHOD FOR CONTROLLING ACCESS TO A TARGET APPLICATION

FIELD OF INVENTION

This application relates to a method for controlling access to a target application.

BACKGROUND OF INVENTION

Security strategies have been implemented to control access to particular machines or equipment. The security strategies can be grouped into two general categories: a physical security strategy and a logical security strategy. In one physical security strategy, a particular location having machines is restricted to authorized personnel. In one logical security strategy, a particular machine can only be accessed if a user utilizes a correct password, has a predetermined biometric parameter, or has a predetermined badge. However, the problem associated with the foregoing security strategies is that once a person has entered a secure area, and has a correct password, the person can potentially access unauthorized applications on machines in the secure area.

Accordingly, the inventors herein have recognized a need for an improved method for controlling access to a target application.

SUMMARY OF INVENTION

A method for controlling access to a target application in accordance with an exemplary embodiment is provided. The method includes determining whether a user is within a predetermined distance from at least one predetermined base device. The method further includes determining whether the predetermined base device is within a predetermined geographical region. The method further includes receiving user access information associated with the user and authenticating the user access information, utilizing an authentication server. The method further includes authorizing a user computer only when the user is within the predetermined distance from the predetermined base device, and the predetermined base device is within the predetermined geographical region, and the user access information corresponds to predetermined user access information associated with the user, utilizing the authentication server. The method further includes allowing the user computer to access the target application on a remote server when the user computer has been authorized.

BRIEF DESCRIPTION OF DRAWINGS

FIGS. 6-8 are flowcharts of a method for controlling access to a target application in accordance with another exemplary embodiment utilizing the system of FIG. 5.

DESCRIPTION OF EXEMPLARY EMBODIMENTS

Figure 1:
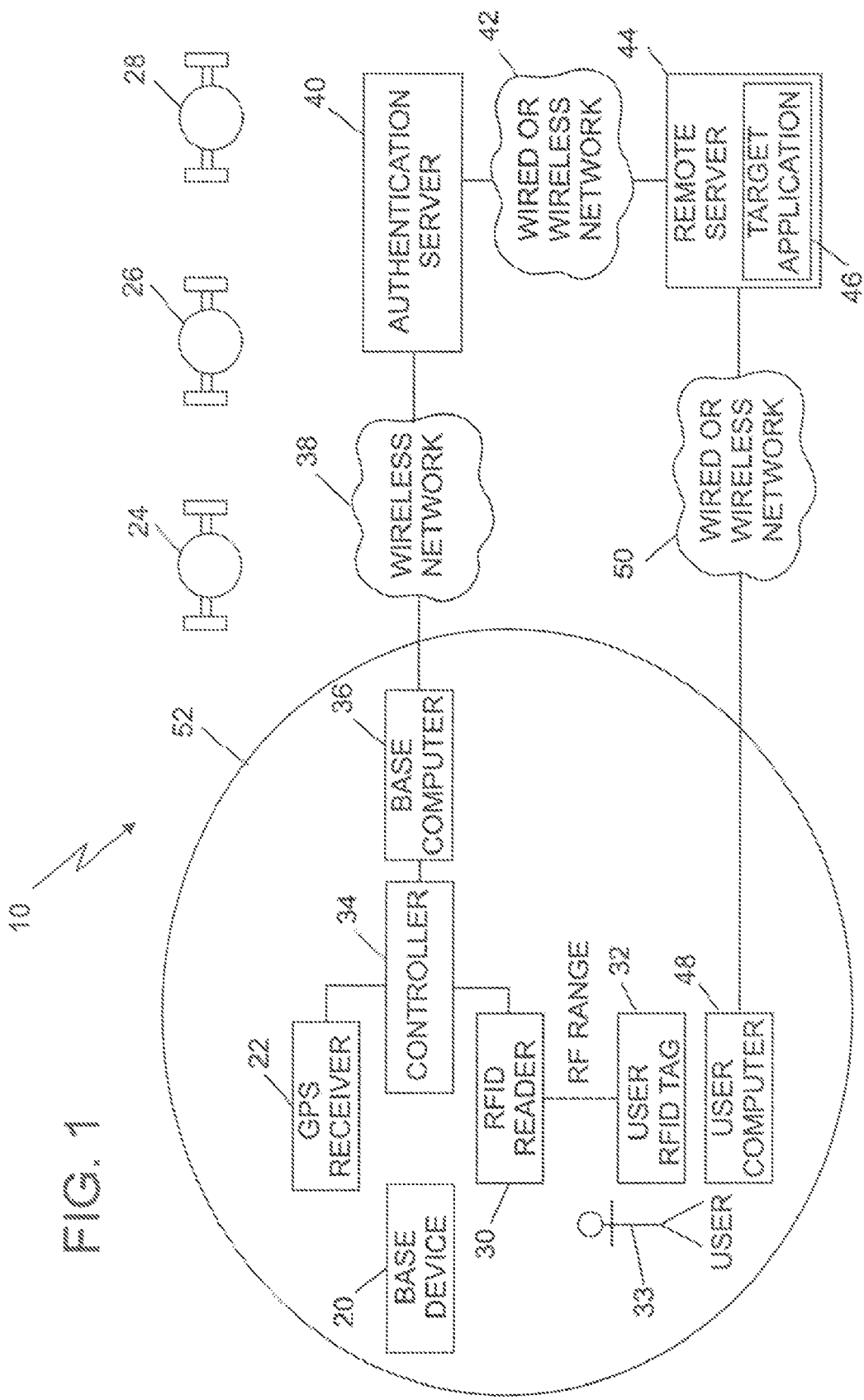
FIG. 1 is a schematic of a system for controlling access to a target application in accordance with an exemplary embodiment.

Referring to FIG. 1, a system 10 for controlling access to a target application 46 in accordance with an exemplary embodiment is illustrated. The system 10 includes a base device 20, a GPS receiver 22, GPS satellites 24, 26, 28, a radio frequency identifier (RFID) reader 30, a controller 34, a base computer 36, a wireless network 38, an authentication server 40, a wired or wireless network 42, a remote server 44, a user computer 48, and a wired or wireless network 50. An advantage of the system 10 is that the system 10 authenticates a user computer based upon both a proximity of the user 33 to the base device 20 and user access information, to allow access to the target application 46. User access information can include at least one of a user identifier, a user password, and a biometric parameter associated with the user 33, for example. The target application 46 comprises a software program or application.

The base device 20 is provided to hold the GPS receiver 22, the RFID reader 30, the controller 34 and the base computer 36 therein. In one exemplary embodiment, the base device 20 is a movable device such as a vehicle for example. When the base device 20 is a movable device, extra security can be applied to check if the base device 20 is within a predetermined authorized geographical region, while the user computer 48 is authenticated for accessing one or more target applications. In another exemplary embodiment, the base device 20 is a stationary device.

The GPS receiver 22 is provided to receive GPS signals from the GPS satellites 24, 26, 28 and to determine a location of the GPS receiver 22 based upon the GPS signals. It should be noted that since the GPS receiver 22 is disposed proximate the base device 20, the position of the GPS receiver 22 is substantially the same position as the base device 20. The GPS receiver sends GPS coordinate information indicating the position of the base device 22 the controller 34.

The RFID reader 30 is provided to receive an RF signal from an RFID tag 32 associated with the user 33, wherein the RF signal has user access information associated with the user 33. The RFID reader 30 has a built-in antenna for receiving RF signals. It should be noted that since the RFID reader 30 is disposed proximate the base device 20, the position of the RFID receiver 30 is substantially the same position as the base device 20 or within a relatively close proximity to the base device 20, and the position of the RFID tag 32 associated with the user 33 is substantially the same position as the base device 20. In one exemplary embodiment, the RFID tag 32 is a passive RFID tag. In another exemplary embodiment, the RFID tag 32 is an active RFID tag. It should be noted that an active RFID tag has an internal battery and can be read within a range of 0-100 meters, while a passive RFID tag does not have an internal battery and can be read within a range of 10 millimeters-5 meters.

The controller 34 is provided to receive user access information associated with the user 33 from the RFID reader 30, and GPS coordinate information indicating the location of the base device 20 from the GPS receiver 22. The controller 34 is further configured to send the user access information and the GPS coordinate information to the base computer 36.

The base computer 36 is provided to receive the user access information and the GPS coordinate information from the controller 34. Further, the base computer 36 is configured to transmit a wireless message utilizing the wireless network 38 having: (i) the user access information, (ii) the GPS coordinate information of the base device 20, and (iii) a base device identifier associated with the base device 20. It should be noted that the base computer 36 can have an internal RF transceiver for communicating with the wireless network 38.

The authentication server 40 is provided to receive the message from the base computer 36 having: (i) the user access information, (ii) the GPS coordinate information of the GPS receiver 22 that is near the base device 20, and (iii) a base device identifier associated with the base device 20. The authentication server 40 is further configured to authenticate the user computer 48 by determining that: (i) the user access information corresponds to a predetermined user access information associated with the user 33, (ii) the user 33 is within a predetermined distance from the base device 20 based on the user access information and the base identifier, and (iii) the base device 20 is within a predetermined geographical region 52 based on the GPS coordinate information. The authentication server 40 operably communicates with the base computer 36 via the wireless network 38. The authentication server 40 can have an internal RF transceiver for communicating with wireless networks. The authentication server 40 operably communicates with the remote server 44 via the wired or wireless network 42.

The remote server 44 is provided to host a target application 46. Further, the remote server 44 is configured to allow the user computer 48 to access the target application 46 when the authentication server 40 has authenticated the user computer 48. During operation, the user computer 48 sends a message through the wired or wireless network 50 to the remote server 44 requesting to access the target application 46. In response, the remote server 44 sends a message through the wired or wireless network 42 to the authentication server 40 requesting an authentication message. Thereafter, if the authentication server 40 has authenticated the user computer 48, the authentication server 40 sends the authentication message indicating the user computer 48 has been authenticated to access the target application 46, to the remote server 44. Thereafter, the remote server 44 allows the user computer 48 to access the target application 46.

Figure 2:
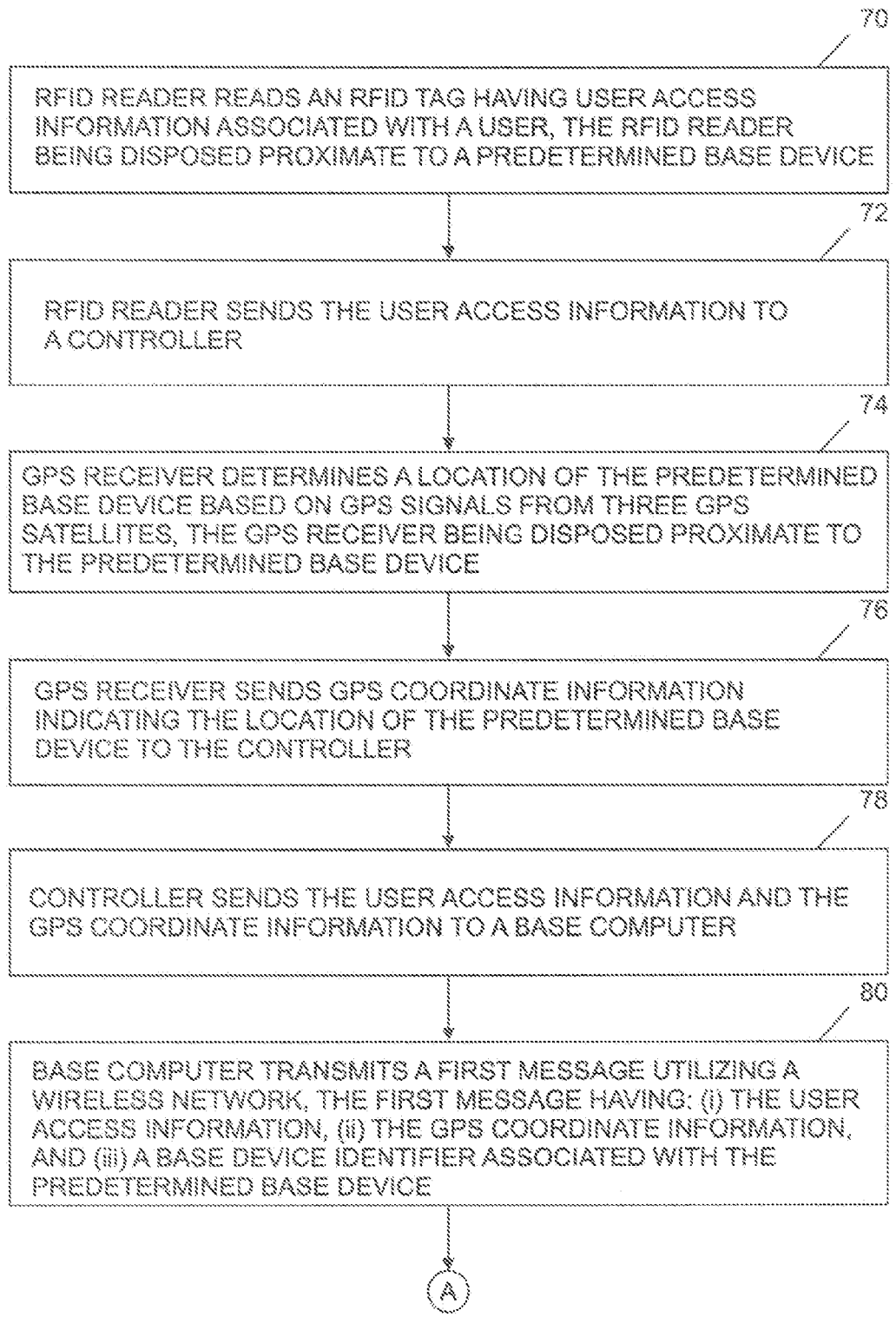
FIGS. 2-4 are flowcharts of a method for controlling access to a target application in accordance with another exemplary embodiment utilizing the system of FIG. 1.
Figure 3:
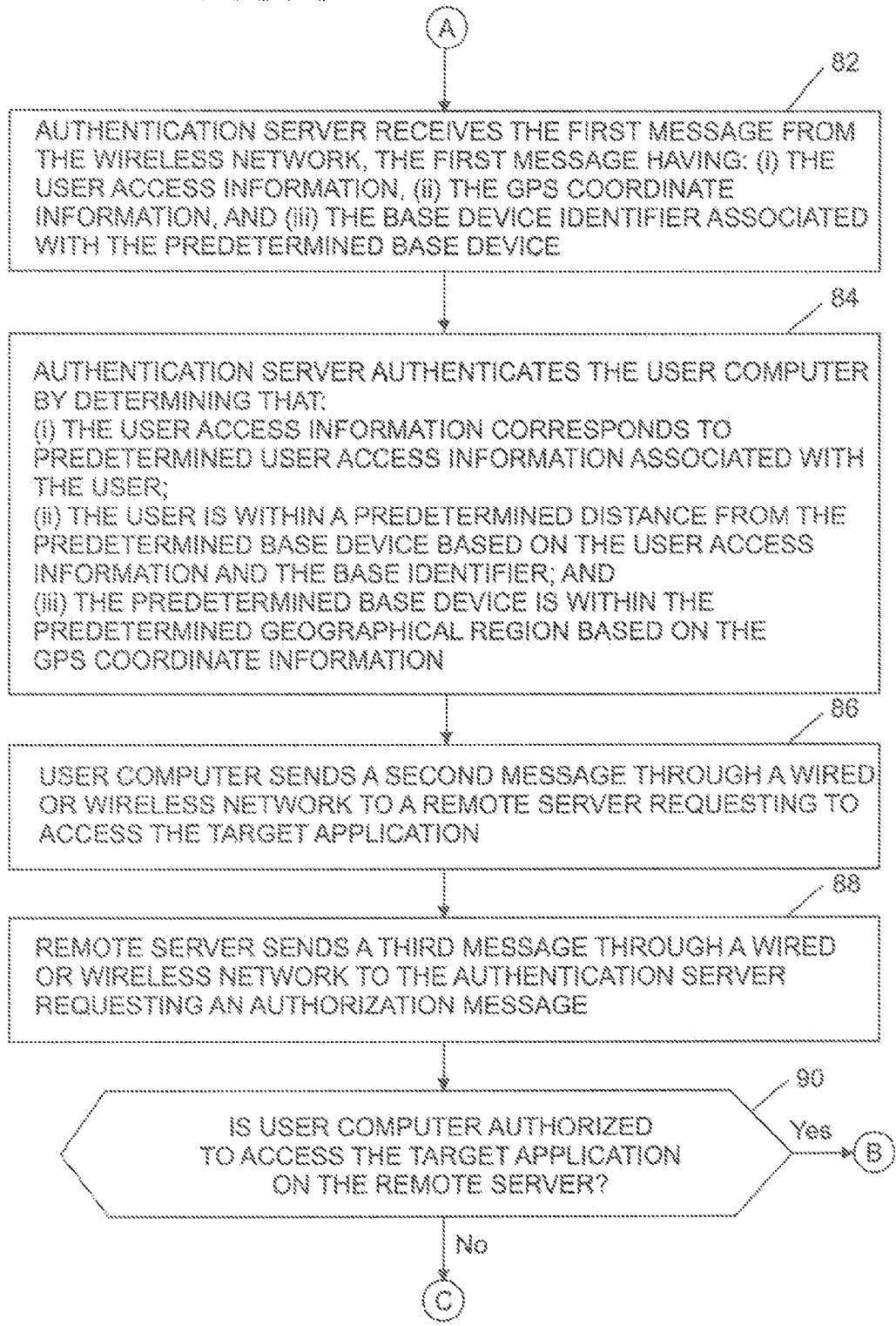
Figure 4:
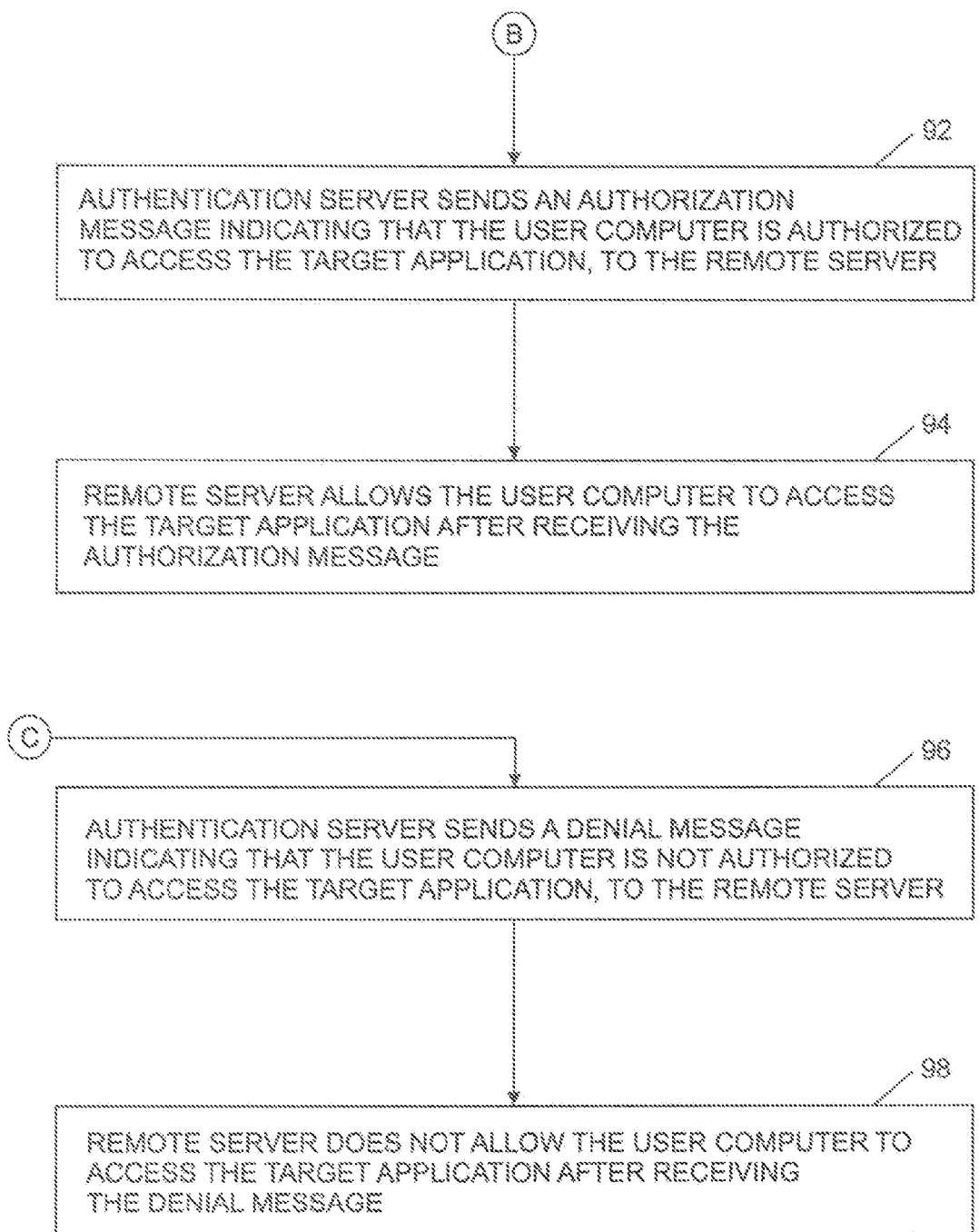

Referring to FIGS. 2 and 3, a flowchart of a method for controlling access to the target application 46 in accordance with another exemplary embodiment will now be explained. It should be noted that although the following method determines a proximity of a user to a single base device for authenticating a user computer, in alternative embodiments, the proximity of a user to a plurality of base devices can be utilized to authenticate a user computer.

At step 70, the RFID reader 30 reads the RFID tag 32 having user access information associated with the user 33. The RFID reader 30 is disposed proximate to the predetermined base device 20.

At step 72, the RFID reader 30 sends the user access information to the controller 34.

At step 74, the GPS receiver 22 determines a location of the predetermined base device 20 based on GPS signals from GPS satellites 24, 26, 28. The GPS receiver 22 is disposed proximate the predetermined base device 20.

At step 76, the GPS receiver 22 sends GPS coordinate information indicating the location of the predetermined base device 20 to the controller 34.

At step 78, the controller 34 sends the user access information and the GPS coordinate information to the base computer 36.

At step 80, the base computer 36 transmits a first message utilizing the wireless network 38. The first message has: (i) the user access information, (ii) the GPS coordinate information, and (iii) a base device identifier associated with the predetermined base device 20.

At step 82, the authentication server 40 receives the first message from the wireless network 38. The first message has: (i) the user access information, (ii) the GPS coordinate information, and (iii) the base device identifier associated with the predetermined base device 20.

At step 84, the authentication server 40 authenticates the user computer 48 by determining that: (i) the user access information corresponds to predetermined user access information associated with the user 33, (ii) the user 33 is within a predetermined distance from the predetermined base device 20 based on the user access information and the base identifier, and (iii) the predetermined base device 20 is within the predetermined geographical region 52 based on the GPS coordinate information. It should be noted that the predetermined geographical region 52 can comprise any geographical region. For example, a geographical region 52 can comprise at least one of a room, a portion of the building, a portion of the city, a portion of the county, a portion of a state, and a portion of a country, and a portion of a continent.

At step 86, the user computer 48 sends a second message through the wired or wireless network 50 to the remote server 44 requesting to access the target application 46.

At step 88, the remote server 44 sends a third message through the wired or wireless network 42 to the authentication server 40 requesting an authorization message.

At step 90, the authentication server 40 makes a determination as to whether the user computer 48 is authorized to access the target application 46 on the remote server 44. In particular, the authentication server 40 reads a preconfigured access control list and access rules of each target application stored in the authentication server 40 to determine whether a user is authorized to access the target application 46. The access control list and the access rules can indicate: (i) which users can access particular target applications, (ii) a time duration for allowing access to particular target applications, and (iii) users that can be authenticated at particular base points. If the value of step 90 equals "yes", the method advances to step 92. Otherwise, the method advances to step 96.

At step 92, the authentication server 40 sends an authorization message indicating the user computer 48 is authorized to access the target application 46, to the remote server 44.

At step 94, the remote server 44 allows the user computer 48 to access the target application 46 after receiving the authorization message. After step 92, the method is exited.

Referring again to step 90, if the value of step 90 equals "no", the method advances to step 96. At step 96, the authentication server 40 sends a denial message indicating the user computer 48 is not authorized to access the target application 46, to the remote server 44.

At step 98, the remote server 44 does not allow the user computer 48 to access the target application 46 after receiving the denial message. After step 98, the method is exited.

It should be noted that in one exemplary embodiment, the user computer 48 can continue to be authorized to use the target application 46 if and only if the authentication server 40 receives messages periodically from the base computer 36 indicating that: (i) the user 33 is within a defined proximity from the base device 20, (ii) the base device 20 is within a predetermined geographical region, and (iii) predefined access rules are being met. Further, the authentication server 40 can send a message to the target application 46 to deny the user computer 48 from accessing the target application 46 for one of the following reasons: (i) if the authentication server 40 does not receive any messages from the base computer 36 after a predefined time interval regarding the user's access information, indicating the user is no longer within a predefined proximity from the base device 20, (ii) if the GPS coordinate information of the base device 20 is no longer within a predefined geographical region, indicating that the base device 20 is not in an authorized and secured region. Thus, even though there may be valid users nearby the base device 20, these users are not allowed to access the target application 46 if the users are located in an unauthorized geographical region.

Figure 5:
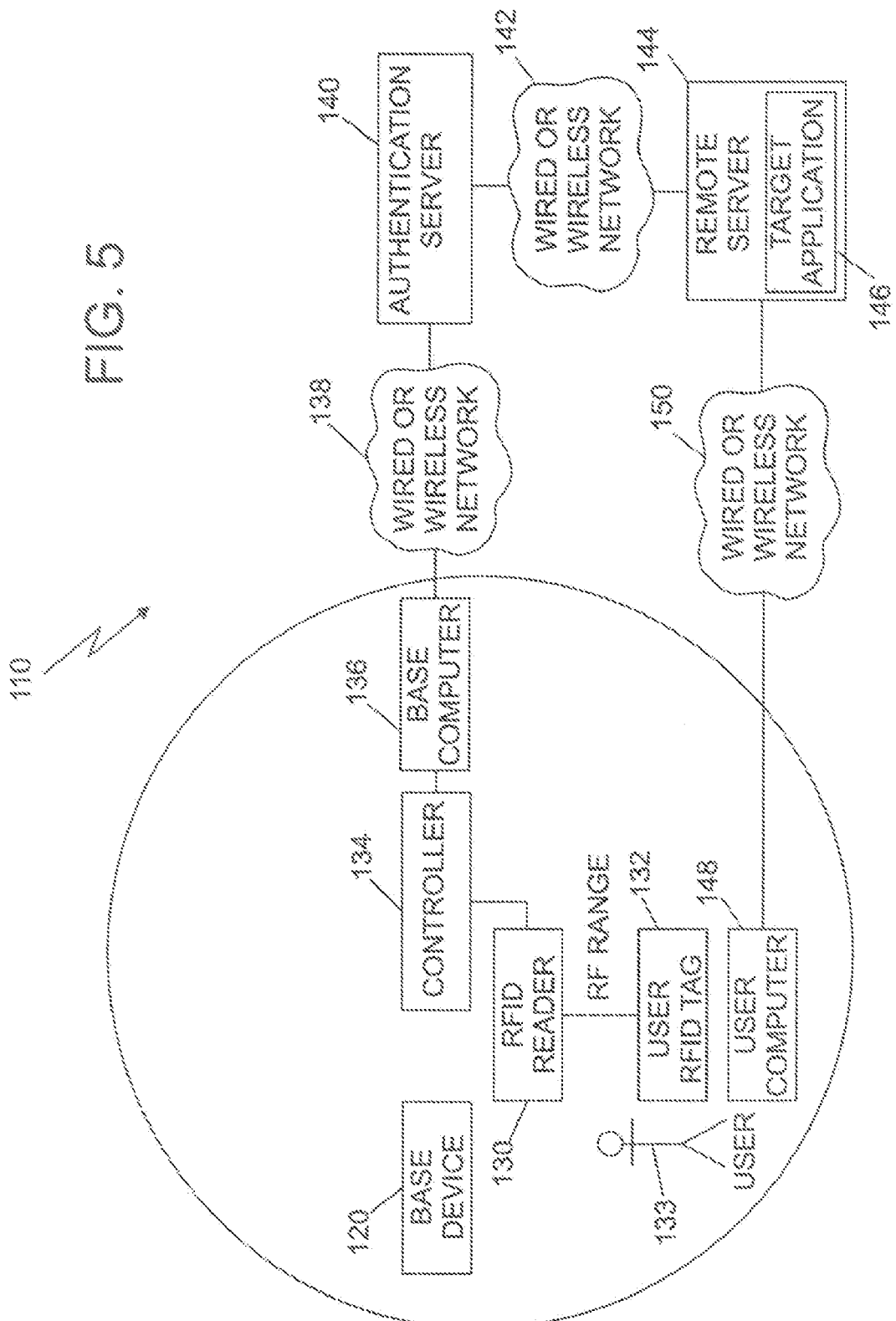
FIG. 5 is a schematic of a system for controlling access to a target application in accordance with another exemplary embodiment.

Referring to FIG. 5, a system 110 for controlling access to a target application 146 in accordance with another exemplary embodiment is illustrated. The system 110 includes a base device 120, an RFID reader 130, a controller 134, a base computer 136, a wireless network 138, an authentication server 140, a wired or wireless network 142, a remote server 144, a user computer 148, and a wired or wireless network 150. An advantage of the system 110 is that the system 110 authenticates the user computer 148 based upon a proximity of the user 133 to the predetermined base device 120 and user access information.

The base device 120 is disposed proximate the RFID reader 130, the controller 134, the base computer 136, and the user computer 148. In one exemplary embodiment, the base device 20 is a stationary device.

The RFID reader 130 is provided to receive an RF signal from an RFID tag 132 associated with the user 133, wherein the RF signal has user access information associated with the user 133. It should be noted that since the RFID reader 130 is disposed proximate the base device 120, the position of the RFID receiver 130 is substantially the same position as the base device 120, and the position of the RFID tag 132 disposed on the user 133 is substantially the same position as the base device 120 or within a relatively close proximity to the base device 120. In one exemplary embodiment, the RFID tag 132 is a passive RFID tag. In another exemplary embodiment, the RFID tag 132 is an active RFID tag.

The controller 134 is provided to receive user access information associated with the user 133 from the RFID reader 130. The controller 134 is further configured to send the user access information and the GPS coordinate information to the base computer 136.

The base computer 136 is provided to receive the user access information from the controller 134. Further, the base computer 136 is further configured to transmit a message utilizing the wired or wireless network 138 having: (i) the user access information, (ii) a base device identifier associated with the base device 120.

The authentication server 140 is provided to receive the message from the base computer 136 having: (i) the user access information, (ii) a base device identifier associated with the base device 120. The authentication server 140 is further configured to authenticate the user computer 148 by determining that: (i) the user access information corresponds to a predetermined user access information associated with the user 133, (ii) the user 133 is within a predetermined distance from the base device 120 based on the user access information and the base identifier; and (iii) the base device 120 is within a predetermined geographical region 152 based on the known position of the base device 120. The authentication server 140 operably communicates with the base computer 136 via the wired or wireless network 138. The authentication server 140 can have an internal RF transceiver for communicating with wireless networks. The authentication server 140 operably communicates with the remote server 144 via the wired or wireless network 142.

The remote server 144 is provided to host the target application 146. Further, the remote server 144 is configured to allow the user computer 148 to access the target application 146 when the authentication server 140 has authenticated the user 133 and authorized the computer 148. During operation, the user computer 148 sends a message through the wired or wireless network 150 to the remote server 144 requesting to access the target application 146. In response, the remote server 144 sends a message through the wired or wireless network 142 to the authentication server 140 requesting authentication message. Thereafter, if the authentication server 140 has authenticated the user computer 148, the authentication server 140 sends the authentication message indicating the user computer 148 has been authenticated to access the target application 146 to the remote server 144. Thereafter, the remote server 144 allows the user computer 148 to access the target application 146.

Referring to FIGS. 6-8, a flowchart of a method for controlling access to the target application 146 in accordance with another exemplary embodiment will now be explained. It should be noted that although the following method determines a proximity of a user to a single base device for authenticating a user computer, in alternative embodiments, the proximity of a user to a plurality of base devices can be utilized to authenticate a user computer.

At step 170, the RFID reader 130 reads the RFID tag 132 having user access information associated with the user 133. The RFID reader 130 is disposed proximate to the predetermined base device 120. The predetermined base device 120 has a known position, known by the authentication server 140.

At step 172, the RFID reader 130 sends the user access information to the controller 134.

At step 174, the controller 134 sends the user access information to the base computer 136.

At step 176, the base computer 136 transmits a first message utilizing the wired or wireless network 138. The first message has: (i) the user access information, and (ii) a base device identifier associated with the predetermined base device 120.

At step 178, the authentication server 140 receives the first message from the wired or wireless network 138. The first message has: (i) the user access information, and (ii) the base device identifier associated with the predetermined base device 120.

At step 180, the authentication server 140 authenticates the user computer 148 by determining that: (i) the user access information corresponds to predetermined user access information associated with the user 133, (ii) the user 133 is within a predetermined distance from the predetermined base device 120 based on the user access information and the base identifier, and (iii) the predetermined base device 120 is within the predetermined geographical region 152 based on the known position of the predetermined base device 120.

At step 182 the user computer 148 sends a second message through the wired or wireless network 152 the remote server 144 requesting to access the target application 146.

At step 184, the remote server 144 sends a third message through the wired or wireless network 142 to the authentication server 140 requesting an authorization message.

At step 186, the authentication server 140 makes a determination as to whether the user computer 148 is authorized to access the target application 146 on the remote server 144. In particular, the authentication server 140 reads a preconfigured access control list and access rules of each target application stored in the authentication server 140 to determine whether a user is authorized to access the target application 146. The access control list and the access rules can indicate: (i) which users can access particular target applications, (ii) a time duration for allowing access to particular target applications, and (iii) users that can be authenticated at particular base points. If the value of step 186 equals "yes", the method advances to step 188. Otherwise, the method advances to step 192.

At step 188, the authentication server 140 sends an authorization message indicating that the user computer 148 is authorized to access the target application 146, to the remote server 144.

At step 190, the remote server 144 allows the user computer 148 to access the target application 146 after receiving the authorization message. After step 188, the method is exited.

Referring again to step 186, if the value of step 186 equals "no", the method advances to step 192. At step 192, the authentication server 140 sends a denial message indicating the user computer 148 is not authorized to access the target application 146, to the remote server 144.

At step 194, the remote server 144 does not allow the user computer 148 to access the target application 146 after receiving the denial message. After step 194, the method is exited.

It should be noted that in one exemplary embodiment, the user computer 148 can continue to be authorized to use the target application 146 if and only if the authentication server 140 receives messages periodically from the base computer 136 indicating that: (i) the user 133 is within a defined proximity from the base device 20, (ii) the base device 120 is within a predetermined geographical region, and (iii) predefined access rules are being met. Further, the authentication server 140 can send a message to the target application 146 to deny the user computer 148 from accessing the target application 146 for one of the following reasons: (i) if the authentication server 140 does not receive any messages from the base computer 136 after a predefined time interval regarding the user's access information, indicating the user is no longer within a predefined proximity from the base device 120.

The methods for controlling access to a target application provide a substantial advantage over other methods. In particular, the methods provide a technical effect of authenticating a user and authorizing the user's computer based upon a set of predefined access rules and access control list indicating both a proximity of the user to a predetermined base device, and user access information, to allow access to the target application.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for controlling access to a target application, comprising:
    determining whether a user is within a predetermined distance from at least one predetermined base device;
    determining whether the predetermined base device is within a predetermined geographical region;
    receiving user access information associated with the user and authenticating the user access information, utilizing an authentication server;
    authorizing a user computer only when the user is within the predetermined distance from the predetermined base device, and the predetermined base device is within the predetermined geographical region, and the user access information corresponds to predetermined access information associated with the user, utilizing the authentication server;
    sending an authorization message from the authentication server through a wired or wireless network to a remote server, the authorization message indicating that the user computer has been authorized to access the target application;
    allowing the user computer to access the target application on the remote server in response to the authorization message being received by the remote server;
    wherein determining whether the user is within the predetermined distance from the predetermined base device, comprises:
        reading a RFID tag having the user access information utilizing a RFID reader, the RFID reader being associated with the predetermined base device; and
        sending the user access information and a base device identifier associated with the predetermined base device to the authentication server; and
        indicating that the user is within the predetermined distance from the predetermined base device when the authentication server receives the user access information and the base identifier.

2. The method of claim 1, further comprising periodically authenticating the user access information and authorizing the user computer.

3. The method of claim 1, wherein determining whether the predetermined base device is within the predetermined geographical region, comprises:
    sending GPS coordinate information indicating a location of the predetermined base device to an authentication server; and
    determining whether the predetermined base device is within the predetermined geographical region based on the GPS coordinate information.

* * * * *